United States Patent
Jeong et al.

(10) Patent No.: US 11,122,616 B2
(45) Date of Patent: *Sep. 14, 2021

(54) METHOD AND APPARATUS FOR ALLOCATING RADIO RESOURCE USING RANDOM ACCESS PROCEDURE IN A MOBILE COMMUNICATION SYSTEM

(71) Applicant: Samsung Electronics Co., Ltd., Gyeonggi-do (KR)

(72) Inventors: Kyeong-In Jeong, Gyeonggi-do (KR); Himke Van Der Velde, Middlesex (GB); Gert Jan Van Lieshout, Middlesex (GB); Yong-Jun Kwak, Gyeonggi-do (KR); Soeng-Hun Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 16/659,115

(22) Filed: Oct. 21, 2019

(65) Prior Publication Data
US 2020/0053771 A1 Feb. 13, 2020

Related U.S. Application Data (63) Continuation of application No. 15/727,136, filed on Oct. 6, 2017, now Pat. No. 10,455,615, which is a (Continued)

(30) Foreign Application Priority Data
Oct. 25, 2006 (KR) .................. 10-2006-0103809

(51) Int. Cl.
*H04W 74/00* (2009.01)
*H04L 5/00* (2006.01)
(Continued)

(52) U.S. Cl.
CPC .......... *H04W 74/004* (2013.01); *H04L 5/003* (2013.01); *H04L 5/0016* (2013.01);
(Continued)

(58) Field of Classification Search
CPC combination set(s) only.
See application file for complete search history.

(56) References Cited

U.S. PATENT DOCUMENTS
| | | |
|---|---|---|
| 6,717,975 B2 | 4/2004 | Kanterakis et al. |
| 6,845,093 B2 | 1/2005 | Dick et al. |
| | | (Continued) |

FOREIGN PATENT DOCUMENTS
| | | |
|---|---|---|
| CN | 1297634 | 5/2001 |
| CN | 1394404 | 1/2003 |
| | (Continued) | |

OTHER PUBLICATIONS
Motorola, "E-UTRAN Non-Synchronized Random Access Procedure", R1-062602, 3GPP TSG RAN1#46bis, Oct. 9, 2006.
(Continued)

*Primary Examiner* — Yemane Mesfin
*Assistant Examiner* — Mon Cheri S Davenport
(74) *Attorney, Agent, or Firm* — The Farrell Law Firm, P.C.

(57) ABSTRACT

Disclosed is a method for performing a random access by a user equipment (UE), including identifying a path loss and a size of a message that the UE will transmit after a transmission of a preamble, selecting a preamble set from at least two preamble sets based on a first threshold and a second threshold, wherein a first preamble set is selected if the path loss is less than the first threshold and the size of the message is greater than the second threshold, wherein a second preamble set is selected if the path loss is greater than or equal to the first threshold, or the size of the message is
(Continued)

less than or equal to the second threshold, selecting a preamble from the selected preamble set, transmitting, to a base station, the selected preamble, receiving, from the base station, a random access response message including resource allocation information in response to the transmission of the selected preamble, and transmitting, to the base station, a radio resource control message based on the resource allocation information.

11 Claims, 7 Drawing Sheets

Related U.S. Application Data continuation of application No. 14/863,668, filed on Sep. 24, 2015, now Pat. No. 9,788,345, which is a continuation of application No. 13/903,631, filed on May 28, 2013, now Pat. No. 9,374,836, which is a continuation of application No. 11/924,368, filed on Oct. 25, 2007, now Pat. No. 8,451,781.

(51) Int. Cl.
*H04W 74/08* (2009.01)
*H04W 48/10* (2009.01)
*H04W 72/08* (2009.01)
*H04W 72/12* (2009.01)
*H04W 84/04* (2009.01)

(52) U.S. Cl.
CPC ........... *H04L 5/0053* (2013.01); *H04W 48/10* (2013.01); *H04W 72/085* (2013.01); *H04W 72/1268* (2013.01); *H04W 74/002* (2013.01); *H04W 74/0866* (2013.01); *H04W 72/087* (2013.01); *H04W 74/0833* (2013.01); *H04W 84/042* (2013.01)

(56) References Cited

U.S. PATENT DOCUMENTS

| | | | |
|---|---|---|---|
| 6,996,155 B2 * | 2/2006 | Kanterakis | H04B 7/2668 370/335 |
| 7,054,298 B1 | 5/2006 | Kim et al. | |
| 7,218,950 B2 | 5/2007 | Qiu et al. | |
| 7,382,753 B2 | 6/2008 | Dick et al. | |
| 7,706,824 B2 | 4/2010 | Schulist et al. | |
| 8,135,420 B2 | 3/2012 | Lee et al. | |
| 8,238,226 B2 | 8/2012 | Sudo | |
| 8,451,781 B2 * | 5/2013 | Jeong | H04L 5/003 370/329 |
| 9,374,536 B1 | 6/2016 | Nola | |
| 9,374,836 B2 * | 6/2016 | Jeong | H04W 48/10 |
| 9,788,345 B2 * | 10/2017 | Jeong | H04W 72/085 |
| 10,455,615 B2 * | 10/2019 | Jeong | H04W 48/10 |
| 2003/0031121 A1 * | 2/2003 | Sudo | H04L 1/0006 370/203 |
| 2004/0071194 A1 | 4/2004 | Suwa | |
| 2004/0146019 A1 | 7/2004 | Kim et al. | |
| 2004/0264550 A1 | 12/2004 | Dabak | |
| 2005/0201334 A1 | 9/2005 | Roh et al. | |
| 2006/0018336 A1 | 1/2006 | Sutivong et al. | |
| 2007/0140178 A1 | 6/2007 | Jung et al. | |

FOREIGN PATENT DOCUMENTS

| | | |
|---|---|---|
| CN | 1723638 | 1/2006 |
| CN | 1805587 | 7/2006 |
| DE | 103 15 044 | 10/2004 |
| JP | 2002-208880 | 7/2002 |
| JP | 2004-320165 | 11/2004 |
| JP | 2004-356725 | 12/2004 |
| JP | 2009-521892 | 6/2009 |
| KR | 1020050057926 | 6/2005 |
| RU | 2 232 469 | 7/2004 |
| WO | WO 99/60729 | 11/1999 |
| WO | WO 00/14989 | 3/2000 |

OTHER PUBLICATIONS

ZTE, "Random Access Preamble and Message", Tdoc R1-061260, 3GPP TSG RAN WG1 #45, May 8, 2006.
Philips, "Asynchronous RACH Preamble Message Design", Tdoc R1-062481, 3GPP TSG RAN WG1 Meeting #46bis, Oct. 9, 2006.
Jim Tomcik et al., "MBFDD and MBTDD: Proposed Draft Air Interface Specification", IEEE 802.20 Working Group on Mobile Broadband Wireless Access, Jan. 6, 2006.
Texas Instruments Inc, "Motivation for Access and Response Types in Unsynchronized RACH", R2-062839, 3GPP TSG RAN WG2 #55, Oct. 9-13, 2006, 3 pages.
Chinese Office Action dated Mar. 1, 2019 issued in counterpart application No. 201610806452.8, 18 pages.
Motorola, "Content of Non-Synchronized Random Access Message", R2-062952, 3GPP TSG RAN WG2 #55, Oct. 9-13, 2006, 3 pages.

* cited by examiner

METHOD AND APPARATUS FOR ALLOCATING RADIO RESOURCE USING RANDOM ACCESS PROCEDURE IN A MOBILE COMMUNICATION SYSTEM

PRIORITY

This application is a Continuation application of U.S. application Ser. No. 15/727,136, filed in the U.S. Patent and Trademark Office on Oct. 6, 2017, which is a continuation of U.S. application Ser. No. 14/863,668, filed in the U.S. Patent and Trademark Office on Sep. 24, 2015, now U.S. Pat. No. 9,788,345, issued on Oct. 10, 2017, which is a continuation of U.S. application Ser. No. 13/903,631, filed in the U.S. Patent and Trademark Office on May 28, 2013, now U.S. Pat. No. 9,374,836, issued on Jun. 21, 2016, which is a continuation of U.S. application Ser. No. 11/924,368, filed in the U.S. Patent and Trademark Office on Oct. 25, 2007, now U.S. Pat. No. 8,451,781, issued on May 28, 2013, and claims priority under 35 U.S.C. § 119(a) to a Korean Patent Application filed in the Korean Intellectual Property Office on Oct. 25, 2006 and assigned Serial No. 10-2006-0103809, the content of each of which is incorporated herein by reference.

BACKGROUND OF THE INVENTION

1. Field of the Invention

The present invention relates generally to a mobile communication system, and in particular, to a method and apparatus for efficiently allocating radio resources to transmit an uplink message of a terminal, or User Equipment (UE), by a network node.

2. Description of the Related Art

The Universal Mobile Telecommunication Service (UMTS) system is a $3^{rd}$ Generation (3G) asynchronous mobile communication system employing Wideband Code Division Multiple Access (WCDMA) based on Global System for Mobile Communications (GSM) and General Packet Radio Services (GPRS), both of which are European mobile communication systems. In $3^{rd}$ Generation Partnership Project (3GPP) in charge of UMTS standardization, a Long Term Evolution (LTE) system is under discussion as the next generation mobile communication system of the UMTS system. The present invention will be described herein with reference to the LTE system, which will now be briefly described.

LTE is a technology for implementing packet-based communication at a high data rate of a maximum of about 100 Mbps, aiming at commercialization in around 2010. To this end, several schemes are under discussion, such as one for reducing the number of nodes located in a communication path by simplifying a configuration of the network, and another for maximally approximating radio protocols to radio channels.

Figure 1:
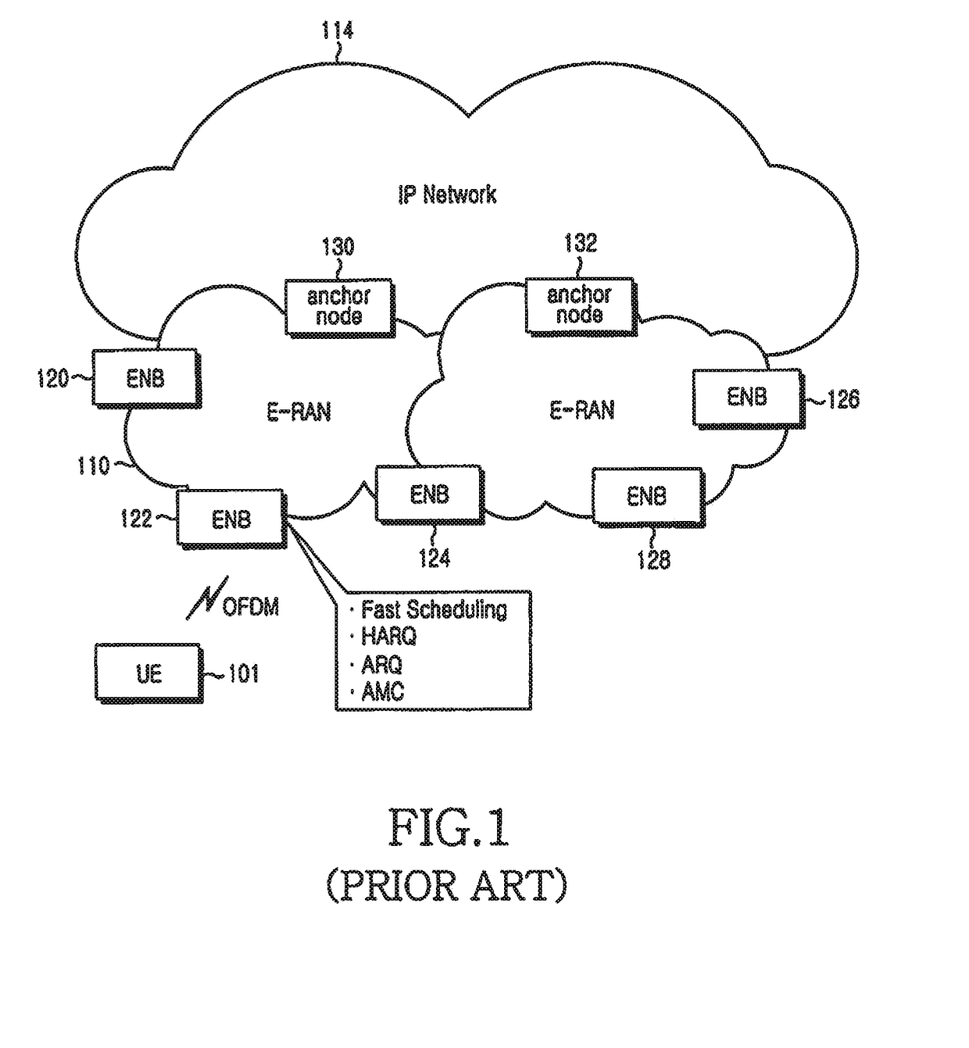
FIG. 1 illustrates a configuration of a 3GPP LTE system to which the present invention is applied.

FIG. 1 illustrates an Evolved UMTS mobile communication system to which the present invention is applied.

Referring to FIG. 1, an Evolved UMTS Radio Access Network (E-UTRAN or E-RAN) 110 is simplified to a 2-node configuration of Evolved Node Bs (ENBs) 120, 122, 124, 126 and 128, and anchor nodes 130 and 132. A UE 101, or terminal, accesses an Internet Protocol (IP) network by means of the E-UTRAN 110.

The ENBs 120 to 128 correspond to the existing Node B of the UMTS system, and are connected to the UE 101 over radio channels. Compared to the existing Node B, the ENBs 120 to 128 perform more complex functions. Particularly, in LTE, because all user traffic including the real-time services, such as Voice over IP (VoIP), is serviced over a shared channel, the ENB collects status information of UEs to perform scheduling depending thereon, and controls a function related to management of radio resources. In addition, control protocols, such as Radio Resource Control (RRC), are included in the ENBs 120 to 128. Generally, each ENB controls a plurality of cells.

To realize the data rate of a maximum of 100 Mbps, LTE uses Orthogonal Frequency Division Multiplexing (OFDM) as a radio access technology in a 20-MHz bandwidth. Further, the ENB performs Adaptive Modulation & Coding (AMC) that adaptively determines a modulation scheme and a channel coding rate according to channel status of the UE 101.

Like the mobile communication system supporting High Speed Downlink Packet Access (HSDPA), High Speed Uplink Packet Access (HSUPA), and Enhanced Dedicated Channel (E-DCH) services, the LTE system also performs Hybrid Automatic Repeat reQuest (HARQ) between the UE 101 and the ENBs 120 to 128. Because various Quality of Service (QoS) requirements cannot be satisfied only with HARQ, Outer ARQ in the upper layer can be performed between the UE 101 and the ENBs 120 to 128.

The HARQ is a technique for soft-combining previously received data with retransmitted data without discarding the previously received data, thereby increasing the reception success rate. This is used to increase the transmission efficiency in high-speed communication such as HSDPA and EDCH.

The random access procedure to which the present invention is applied is used as a procedure between a UE and a network node, in which a UE in RRC idle mode or an RRC connected mode matches uplink timing sync with the ENB for (initial) uplink message/data transmission, sets initial uplink transmission power, and/or requests radio resource allocation for the (initial) uplink message/data transmission. For a definition of the RRC idle mode and RRC connected mode, reference can be made to the 3GPP TR25.813v700 standard.

In brief, the RRC idle mode generally refers to a state of a UE, in which the ENB has no context information for the UE and the anchor node, or upper node, has context information of the UE, so a location of the UE is managed not in units of cells but in units of tracking area for paging.

The RRC connected mode refers to a state of a UE, in which not only the anchor node but also the ENB have the context information of the UE and an RRC connection is set up between the UE and the ENB, so the location of the UE can be managed in units of cells.

Figure 2:
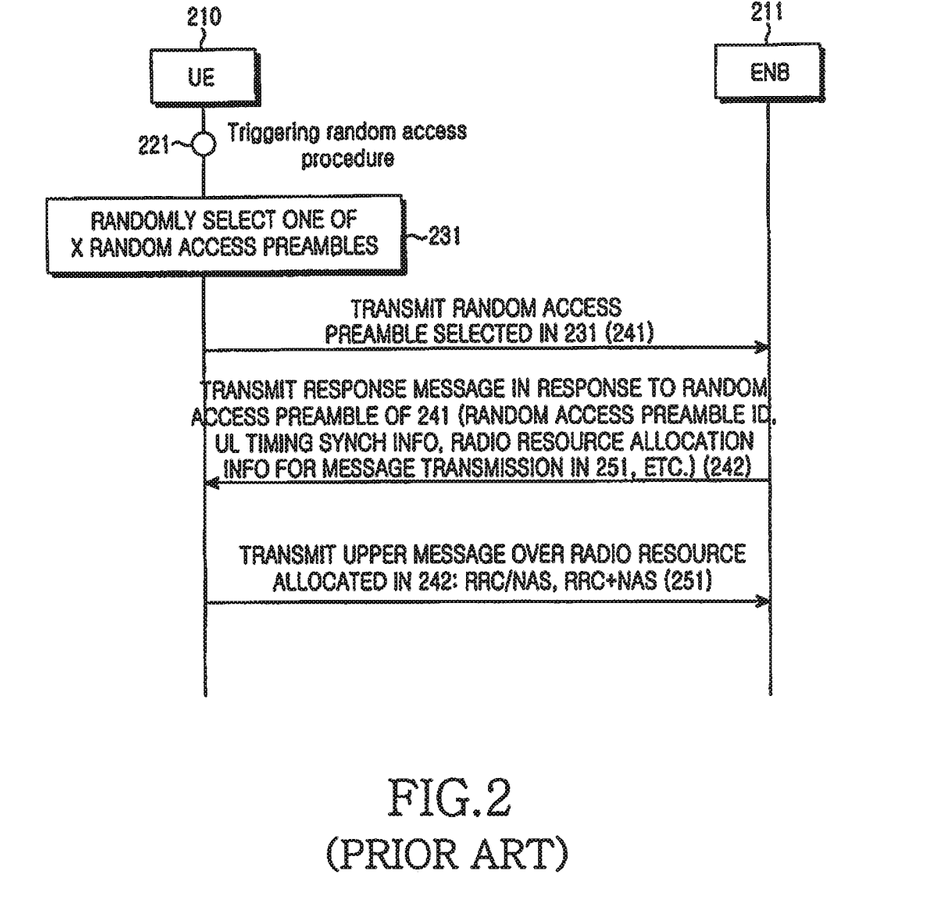
FIG. 2 illustrates a conventional random access procedure in the 3GPP LTE system.

FIG. 2 illustrates a conventional random access procedure in a 3GPP LTE system.

Referring to FIG. 2, reference numeral 210 denotes a UE, and reference numeral 211 denotes an ENB that controls the cell in which the UE 210 is located.

Step 221 indicates an operation in which the UE 210 triggers a random access procedure. For example, this can indicate the case where to start a call, an RRC idle mode UE (UE in the RRC idle mode) needs to transmit an uplink control message which allows the ENB 211 to acquire UE context information, set up an RRC connection between the UE 210 and the ENB 211, and transmit a service request to an anchor node.

If the random access procedure is triggered in step 221, the UE 210 randomly selects one of a total of X random access preambles agreed with the ENB 211 in step 231. Thereafter, in step 241, the UE 210 transmits the selected random access preamble to the ENB 211 over a predetermined channel/time.

When transmitting the random access preamble in step 241, the UE 210 sets initial random access preamble's transmission power of UE by applying Open Loop Power Control (OLPC). Equation (1) shows the conventional manner of performing the conventional OLPC.

$$P_{TX} = L_{pilot} + I_{BTS} + SIR_{TARGET} \quad (1)$$

The parameters of Equation (1) are defined as follows:

$P_{TX}$: a transmission power level [dBm] of a channel DPCH;

$L_{pilot}$: a path loss [dB] estimated using a measure of a downlink pilot channel and a transmission power of a signaled pilot channel;

$I_{BTS}$: an interference level that a receiver of an ENB (or Base Transceiver System (BTS)) experiences;

$SIR_{TARGET}$: a target Signal-to-Interference Ratio (SIR) [dB] for maintaining the transmission quality of each UE. It can be either signaled separately for each UE or signaled commonly for all UEs.

If the random access preamble is retransmitted due to the failure in the initial random access preamble transmission of step 241, a delta value (hereinafter power ramp step) is added to the power that is set during the previous random access preamble transmission. The power ramp step can be either signaled, or defined as a specific value.

In step 242, the ENB 211 transmits to the UE 210 a response message to the random access preamble received in step 241. The response message 242 includes such information as a random access preamble identifier indicating the random access preamble received in step 231, uplink timing sync information for matching uplink timing sync and radio resource allocation information for transmission 251 of the next uplink upper message of the UE 210.

In the transmission of the response message by the ENB 211 in step 242, the ENB 211 can perform synchronous transmission using the timing relationship determined for the transmission of step 241 by the UE 210.

If the information received in step 242 includes a random access preamble IDentifier (ID) mapped to the random access preamble transmitted in step 241 by the UE 210 itself, the UE 210 corrects the uplink transmission timing, using the uplink timing sync information included in the received information of step 242. In step 251, the UE 210 transmits the corresponding upper message over the corresponding channel/time using the allocated radio resources.

The message transmitted in step 251 can be an RRC message or a Non-Access Stratum (NAS) message. Alternative, the message can be a combined message of the RRC message and the NAS message. Here, the RRC message indicates a message for Radio Resource Control (RRC), having a UE and an ENB as protocol endpoints, and the NAS message indicates a message for controlling parameters such as mobility, service and session of a UE, having a UE and an anchor node as protocol endpoints.

However, in the 3GPP LTE system that performs the random access procedure of FIG. 2, when the ENB 211 allocates, to the UE 210, radio resources for transmission of an upper message in step 242, it can perform resource allocation only for the message size guaranteed such that all UEs in the cell can transmit the message. This is because when the ENB 211 receives the random access preamble from the UE 210 in step 241, the information transmitted through the random access preamble only includes a random ID.

In other words, the random access preambles have only the random IDs without including other information, to prevent the UE 210 from selecting the same random access preamble, thus preventing occurrence of the collision.

Therefore, because the ENB 211, receiving this random access preamble, cannot acquire any information necessary for scheduling, from the random access preamble, even though the UE is located in the cell boundary, the ENB 211 cannot allocate the radio resources for the transmission-guaranteed message size.

Therefore, the random access procedure of the mobile communication system shown in FIG. 2 is inefficient in scheduling the next message transmitted from the UE 210 by the ENB 211.

In addition, if the ENB 211 includes in the random access preambles the information (e.g., cause/type information of the random access procedure, priority information of the random access procedure and radio channel condition information) capable of assisting in performing scheduling, the ENB 211 may very efficiently perform scheduling on the next message transmitted from the UE 210.

However, the number of random access preambles that the UE can guarantee the transmission at any place in the cell is limited, using the limited radio resources when there is no RRC connection set up between the UE and the ENB.

To carry all the information on the limited random access preambles decreases the number of random IDs that reduce the collision probability, thereby causing the increasing collision problem that multiple UEs select the same random access preamble in the random access procedure, in which procedure an increase in the collision probability to at least a certain level may raise a fatal problem.

Therefore, the current mobile communication system needs an efficient random access procedure for solving the foregoing problems.

SUMMARY OF THE INVENTION

An aspect of the present invention is to address at least the problems and/or disadvantages and to provide at least the advantages described below. Accordingly, an aspect of the present invention is to provide a method and apparatus capable of efficiently allocating radio resources to transmit an uplink message of a UE by a network node after receiving a random access preamble, based on efficient random access preamble design in a random access procedure.

Another aspect of the present invention is to provide a method and apparatus in which a UE transmits an efficient random access preamble to a network node and receives radio resources allocated therefrom, based on efficient random access preamble design in the mobile communication system.

According to the present invention, there is provided a method for performing a random access by a UE in a wireless communication system, including identifying a path loss and a size of a message that the UE will transmit after a transmission of a preamble, selecting a preamble set from at least two preamble sets based on a first threshold and a second threshold, wherein a first preamble set is selected if the path loss is less than the first threshold and the size of the message is greater than the second threshold, wherein a second preamble set is selected if the path loss is greater than or equal to the first threshold, or the size of the message is less than or equal to the second threshold, selecting a preamble from the selected preamble set, transmitting, to a base station, the selected preamble, receiving, from the base station, a random access response message including resource allocation information in response to the transmission of the selected preamble, and transmitting, to the base station, a radio resource control message based on the resource allocation information.

According to the present invention, there is provided a UE for performing a random access in a wireless communication system, including a transceiver configured to transmit or receive data, and a controller configured to identify a path loss and a size of a message that the UE will transmit after a transmission of a preamble, select a preamble set from at least two preamble sets based on a first threshold and a second threshold, wherein a first preamble set is selected if the path loss is less than the first threshold and the size of the message is greater than the second threshold, and wherein a second preamble set is selected if the path loss is greater than or equal to the first threshold, or the size of the message is less than or equal to the second threshold, select a preamble from the selected preamble set, transmit, to a base station, the selected preamble, receive, from the base station, a random access response message including resource allocation information in response to the transmission of the selected preamble, and transmit, to the base station, a radio resource control message based on the resource allocation information.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will now be described in detail with reference to the annexed drawings. In the following description, a detailed description of known functions and configurations incorporated herein has been omitted for the sake of clarity and conciseness.

Although the present invention will be described herein with reference to a Long Term Evolution (3GPP LTE) system evolved from the 3rd Generation Partnership Project (3GPP) Universal Mobile Telecommunication Service (UMTS) system, by way of example, the present invention can be applied to all mobile communication systems to which ENB scheduling is applied, without separate modification.

In addition, the present invention can be applied to the communication systems to which the random access procedure is applied, without separate modification. Further, the present invention can be applied to the systems supporting uplink services.

The present invention provides a scheme in which a network node can efficiently allocate radio resources to transmit an uplink message from a UE upon receipt of a random access preamble through efficient random access preamble design in a random access procedure.

Therefore, when a UE is in a good radio channel condition and a size of a message that the UE will transmit after transmitting a random access preamble and receiving a response thereto is greater than a predefined minimum message size, the present invention separately defines a random access preamble set that the UE will select in the random access procedure. In another case, i.e. when the radio channel condition of the UE is not good or the size of the message that the UE will transmit after transmitting a random access preamble and receiving a response thereto is less than or equal to the predefined minimum message size, the present invention separately defines a random access preamble set that the UE will select in the random access procedure.

In addition, when the UE is in the good radio channel condition and the size of the transmission message is greater than the predefined minimum message size, the UE provides the information to the network node with use of the corresponding random access preamble set, so the network node can allocate radio resources so that it can transmit a message greater than the predefined minimum message size over a response message to the random access preamble.

Further, when the radio channel condition of the UE is not good or the size of the message that the UE will transmit after transmitting the random access preamble and receiving a response thereto is less than or equal to the predefined minimum message size, the UE provides the information to the network node with use of the random access preamble set corresponding thereto, so the network node can allocate radio resources so that it can transmit a message corresponding only to the predefined minimum message size over a response message to the random access preamble.

Therefore, the present invention provides a scheme for allowing an ENB to efficiently perform scheduling on the next message sent from a UE by including the minimum supplemental information in the random access preamble design.

According to the present invention, the supplemental information indicates an occasion when a UE is in a radio channel condition that is greater than a threshold Y and a size of the message that the UE will transmit next is greater than a transmission-guaranteed minimum message size Z even though the UE is located in the cell boundary.

That is, a total of X random access preambles agreed between the UE and the ENB are divided into two sets. One arbitrary set A is defined to indicate an occasion when the UE is in a radio channel condition that is greater than the threshold Y and a size of the next message that the UE will transmit is greater than the minimum message size Z. Another set B is defined to be used when the above condition is unsatisfied.

As a result, upon receipt of a random access preamble corresponding to the set A, the ENB can allocate radio resources for transmission of a message greater than Z when scheduling transmission of the next message of the UE. However, upon receipt of a random access preamble corresponding to the set B, the ENB can allocate radio resources for transmission of a message with the size Z when scheduling transmission of the next message of the UE.

The threshold Y used for determining a good radio channel condition or the size Z of a message, transmission of which is guaranteed even in the cell boundary, can be either determined as one value regardless the cell and undergo hard-coding, or signaled through broadcasted system information according to cells.

It is noted that throughout the description herein, a radio channel condition that is determined to be greater than a threshold, indicates that the radio channel condition is better than a condition related to the particular threshold.

Table 1 shows an example of the random access preamble design disclosed in the present invention when the total number of random access preambles is assumed to be X=64. Although the set A and the set B are equal in the number X/2 of allocated random access preambles in Table 1, by way of example, the set A and the set B may be different in the number of random access preambles allocated thereto.

TABLE 1

| Set | Random ID | Random access preamble # |
| --- | --- | --- |
| Set A | 0 | Random access preamble #0 |
| | 1 | Random access preamble #1 |
| | 2 | Random access preamble #2 |
| | 3 | Random access preamble #3 |
| | 4 | Random access preamble #4 |
| | 5 | Random access preamble #5 |
| | 6 | Random access preamble #6 |
| | 7 | Random access preamble #7 |
| | 8 | Random access preamble #8 |
| | 9 | Random access preamble #9 |
| | 10 | Random access preamble #10 |
| | 11 | Random access preamble #11 |
| | 12 | Random access preamble #12 |
| | 13 | Random access preamble #13 |
| | 14 | Random access preamble #14 |
| | 15 | Random access preamble #15 |
| | 16 | Random access preamble #16 |
| | 17 | Random access preamble #17 |
| | 18 | Random access preamble #18 |
| | 19 | Random access preamble #19 |
| | 20 | Random access preamble #20 |
| | 21 | Random access preamble #21 |
| | 22 | Random access preamble #22 |
| | 23 | Random access preamble #23 |
| | 24 | Random access preamble #24 |
| | 25 | Random access preamble #25 |
| | 26 | Random access preamble #26 |
| | 27 | Random access preamble #27 |
| | 28 | Random access preamble #28 |
| | 29 | Random access preamble #29 |
| | 30 | Random access preamble #30 |
| | 31 | Random access preamble #31 |
| Set B | 0 | Random access preamble #32 |
| | 1 | Random access preamble #33 |
| | 2 | Random access preamble #34 |
| | 3 | Random access preamble #35 |
| | 4 | Random access preamble #36 |
| | 5 | Random access preamble #37 |
| | 6 | Random access preamble #38 |
| | 7 | Random access preamble #39 |
| | 8 | Random access preamble #40 |
| | 9 | Random access preamble #41 |
| | 10 | Random access preamble #42 |
| | 11 | Random access preamble #43 |
| | 12 | Random access preamble #44 |
| | 13 | Random access preamble #45 |
| | 14 | Random access preamble #46 |
| | 15 | Random access preamble #47 |
| | 16 | Random access preamble #48 |
| | 17 | Random access preamble #49 |
| | 18 | Random access preamble #50 |
| | 19 | Random access preamble #51 |
| | 20 | Random access preamble #52 |
| | 21 | Random access preamble #53 |
| | 22 | Random access preamble #54 |
| | 23 | Random access preamble #55 |
| | 24 | Random access preamble #56 |
| | 25 | Random access preamble #57 |
| | 26 | Random access preamble #58 |
| | 27 | Random access preamble #59 |
| | 28 | Random access preamble #60 |
| | 29 | Random access preamble #61 |
| | 30 | Random access preamble #62 |
| | 31 | Random access preamble #63 |

Although not shown herein, the present invention can be extended as follows. For example, if other 2-bit information except for a random ID can be included in a random access preamble, the random access preamble can be designed as the following Sets A-D.

Random Access Preamble Set A: This set is used when a radio channel condition is determined to be greater than a than a threshold Y1 and a size of the message that the UE will transmit next is greater than a minimum size Z1 of a message transmittable even in the cell boundary, and less than or equal to a particular size Z2.

Random Access Preamble Set B: This set is used when a radio channel condition is determined to be greater than a threshold Y2 and a size of the message that the UE will transmit next is greater than the particular size Z2 limited to the random access preamble set # A, and less than or equal to a particular size Z3.

Random Access Preamble Set C: This set is used when a radio channel condition is determined to be greater than a threshold Y3 and a size of the message that the UE will transmit next is greater than a particular size Z3 limited to the random access preamble set # B, and less than or equal to a particular size Z4.

Random Access Preamble Set # D: This set is used when a radio channel condition is determined to be greater than a threshold Y4 and a size of the message that the UE will transmit next is greater than a particular size Z4 limited to the random access preamble set # B.

Figure 3:
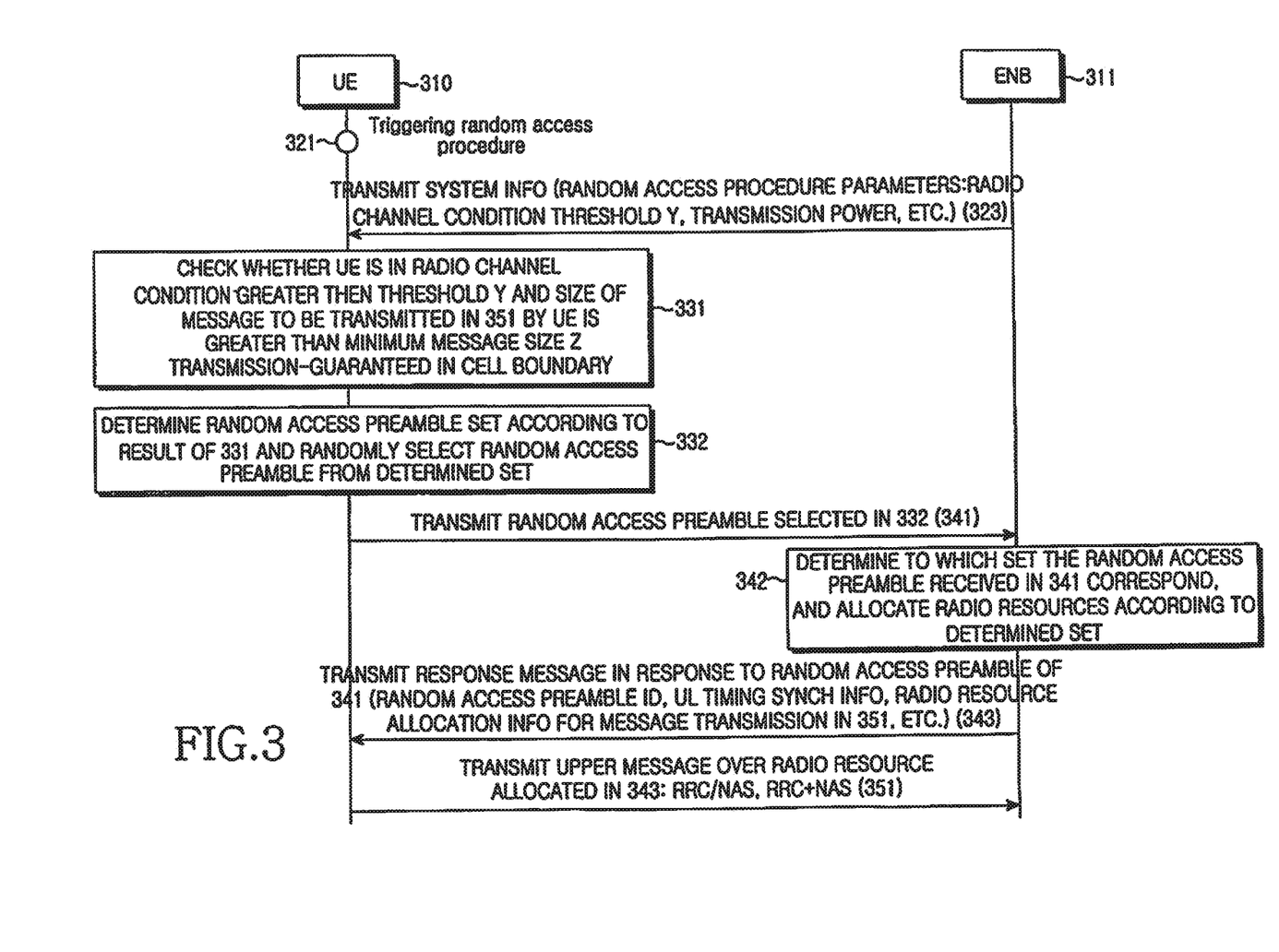
FIG. 3 illustrates a random access procedure obtained based on the random access preamble design according to the present invention.

FIG. 3 illustrates an example of a random access procedure obtained based on the random access preamble design disclosed in the present invention. Reference numeral 310 denotes a UE, and reference numeral 311 denotes an ENB that controls and manages the cell in which the UE 310 is located.

Referring to FIG. 3, step 321 indicates an operation in which the UE 310 triggers the random access procedure. For example, this can indicate the case where to start a call, an RRC idle mode UE needs to transmit an uplink control message.

Step 323 indicates an operation in which random access procedure-related control parameters are broadcasted as system information in the cell. The random access procedure-related parameters can include such information as radio resource allocation information used for performing the random access procedure and radio channel condition threshold Y, transmission power.

The radio resource allocation information used for the random access procedure indicates time/frequency radio resources with which the UE 310 will transmit a random access preamble in the random access procedure. The radio channel condition threshold Y is a criterion used when the UE 310 determines in step 331 whether it is in a good radio channel condition. The transmission power is a value used when the UE 310 determines the radio channel condition.

In particular, the transmission power is a value used when calculating a path loss in the radio channel condition, and the path loss can be calculated using Equation (2), as follows.

$$\text{Path Loss} = \text{Transmission Power} - \text{Reception Power} \quad (2)$$

Herein, the path loss is a value acquired in a long term determined by such parameters as propagation loss, shadowing, slow fading and antenna pattern, and because the downlink and uplink show the similar values, the path loss information can be used for estimating the uplink channel status.

Although it is shown in FIG. 3 that step 323 is performed after step 321, if the UE 310 has already acquired the latest random access procedure-related parameter through the previous system information before the random access procedure is triggered in step 321, the UE 310 can perform the next step 331 immediately after the random access procedure is triggered in step 321, since the system information including the random access procedure-related parameter is periodically transmitted in the cell. Thus, if the UE 310 has already acquired the latest random access procedure-related parameter before step 321, the reception of the system information in step 323 can be omitted.

Upon receiving the random access procedure-related parameter through the system information in step 331, the UE 310 determines based on the parameter whether it is in a radio channel condition that is greater than a threshold Y and a size of the message that the UE 310 will transmit is greater than a minimum message size Z transmission-guaranteed in the cell boundary.

The radio channel condition can be determined by two separate methods. In a first method, the UE uses Channel Quality Information (CQI) indicating a received Signal-to-Noise Ratio (SNR) obtained by measuring a downlink pilot. In a second method, the UE 310 uses the path loss information defined in Equation (2) rather than the channel quality information.

Herein, the channel quality information indicates a value obtained by considering fast fading, and because the fast fading occurs independently in the downlink and the uplink, the channel quality information may not be suitable to be used for estimating the uplink channel status and performing scheduling for transmission of the initial uplink message. Therefore, the path loss information is used instead of the channel quality information. Generally, because the path loss is similar to some extent in both the downlink and the uplink, the path loss, compared to the channel quality information, may be suitable for estimating the uplink channel status and performing scheduling for transmission of the initial uplink message. That is, the channel quality information and the path loss are interchangeable as parameters than can be used for estimating the uplink channel status, and can be selected based on the circumstances or the system designer's choice.

Although the present invention uses a method of comparing the path loss information with a threshold Y, by way of example, the present invention does not exclude a method of comparing the channel quality information with a threshold Y.

Therefore, in step 331, the UE 310 determines a path loss in accordance with Equation (2) using the transmission power received in step 323 and the reception power for a downlink pilot channel measured for a set interval. Thereafter, the UE 310 compares the acquired path loss with the radio channel condition threshold Y received in step 323. If the path loss is less than or equal to the threshold Y, it is determined that the UE 310 is in a radio channel condition that is greater than the threshold Y. This is because the path loss has an inverse proportional relationship with the decision on whether the UE 310 is in the good radio channel condition.

However, if the channel quality information is used according to the second method, the channel quality information has a proportional relationship between with the decision on whether the UE 310 is in the good radio channel condition. Accordingly, the UE 310 determines in step 331 a received SNR for the downlink pilot channel measured for an interval. Thereafter, the UE 310 compares it with the radio channel condition threshold Y received in step 323. If the channel quality information is greater than or equal to the threshold Y, the UE 310 determines that it is in the radio channel condition that is greater than the threshold Y.

Further, in step 331, the UE 310 determines whether a size of the transmission message is greater than the minimum message size Z transmission-guaranteed in the cell boundary. As to the minimum message size Z checked herein, the minimum message size can be set to one standard value, or a different value can be signaled for every cell through the system information of step 323.

As a result, if the UE 310 determines in step 331 that it is in a radio channel condition that is greater than a threshold Y and a size of the message that the UE 310 will transmit over the uplink is greater than the minimum message size transmission-guaranteed even in the cell boundary, the UE 310 proceeds to step 332.

In step 332, the UE 310 randomly selects one random access preamble from a random access preamble set mapped to the above condition. However, if the condition of step 331 is not satisfied, the UE 310 randomly selects one random access preamble from another random access preamble set separately defined according to the present invention.

For example, under the assumption of the random access preamble design shown in Table 1, if, as given on the condition of step 331, the UE 310 is in the radio channel condition that is greater than the threshold Y and the size of the message that it will transmit over an upper message is greater than the minimum message size transmission-guaranteed even in the cell boundary, the UE 310 randomly selects one of the random access preambles #0-#31 in the random access preamble set A.

However, if the condition of step 331 is not satisfied, the UE 310 randomly selects one of the random access preambles #32-#63 in the random access preamble set B.

In step 341, the UE 310 transmits the random access preamble selected in step 332 to the ENB 311. In step 342, the ENB 311 determines which condition the received random access preamble satisfies. That is, the ENB 311 determines to which set the received random access preamble corresponds, and based thereon, allocates radio resources for allowing the UE 310 to transmit an upper message over the uplink, considering the status information (e.g., radio channel condition) of the UE 310.

For example, if the random access preamble received in step 341 is one of the random access preambles #0-#31 in set A, the ENB 311 can allocate in step 342 radio resources for message transmission such that the UE 310 can transmit a message, a size of which is greater than the minimum message size transmission-guaranteed in the cell boundary.

However, if the random access preamble received in step 341 is one of the random access preambles #32-#63 in set B, the ENB 311 allocates in step 342 radio resources for message transmission such that the UE 310 can transmit a message, a size of which equals to the minimum message size transmission-guaranteed in the cell boundary.

In step 343, the ENB 311 transmits to the UE 310 a response message to the random access preamble received in step 341. The response message includes a random access preamble identifier indicating such information as the received random access preamble, uplink timing sync information for matching uplink timing sync and radio resource information for the next uplink upper message transmission.

The response message transmission of step 343 can be synchronized to the random access preamble transmission of step 341 with a set timing relationship. That is, if the UE 310 determines that the information received in step 343 includes a random access preamble identifier mapped to the random access preamble transmitted in step 341 by the UE 310 itself, the UE 310 corrects the uplink transmission timing using the uplink timing sync information included in the information received in step 343.

In step 351, the UE 310 transmits the corresponding upper message at the corresponding channel/time using the radio resources allocated in step 343. Here, the message transmitted in step 351 can be either an RRC message or a NAS message. Alternatively, the message can be a combined message of the RRC message and the NAS message. The RRC message indicates a message for Radio Resource Control (RRC), having a UE and an ENB as protocol endpoints, and the NAS message indicates a message for controlling parameters such as mobility, service and session of a UE, having a UE and an anchor node as protocol endpoints.

In addition, the ENB 311 can broadcast in step 323 an interference level at an ENB antenna instead of the radio channel condition threshold Y. This can be defined as a third method.

Then, in step 331, if its maximum transmission power (Maximum UE transmission power) is greater than or equal to a sum of the received interference information at an ENB antenna (Interference at ENB), a path loss measured in decibels [dB] calculated using transmission power and reception power for a downlink pilot channel, and an alpha, the UE 310 determines that it is in a good radio channel condition. For this, reference can be made to Equation (3) below. Herein, the alpha can be either fixed to one standard value, or transmitted in the system information broadcasted in step 323.

However, in step 331, if the maximum transmission power of the UE 310 is less than or equal to the sum of the received interference information at the ENB antenna, the path loss calculated using transmission power and reception power for the downlink pilot channel, and the alpha, the UE 310 determines that it is not in the good radio channel condition. In addition, if the maximum transmission power of the UE 310 is greater than the sum of the received interference information at the ENB antenna, the path loss calculated using transmission power and reception power for the downlink pilot channel, and the alpha, the UE 310 determines that it is in the good radio channel condition.

However, if the maximum transmission power of the UE 310 is less than the sum of the received interference information at the ENB antenna, the path loss calculated using transmission power and reception power for the downlink pilot channel, and the alpha, the UE 310 may determine that it is not the good radio channel condition. In addition, if the maximum transmission power of the UE 310 is greater than or equal to the sum of the received interference information at the ENB antenna, the path loss calculated using transmission power and reception power for the downlink pilot channel, and the alpha, the UE 310 may determine that it is in the good radio channel condition. In the aforementioned Equation (3), 1. Maximum UE Transmission Power≥Interference at ENB+Path_Loss+Alpha [dB]: UE is in good radio channel condition 2. Maximum UE Transmission Power≤Interference at ENB+Path_Loss+Alpha [dB]: UE is not in good radio channel condition (3)

As described above, the UE 310 checks its own radio channel condition depending on the random access procedure-related parameters broadcasted in the cell, and separately selects a random access preamble from set A or set B, which is a random access preamble selection condition, considering its own radio channel condition and the minimum size necessary for the next uplink upper message transmission.

The ENB 311 determines whether the random access preamble received from the UE 310 is transmitted from the separated set A or set B, thereby efficiently allocating radio resources.

Figure 4:
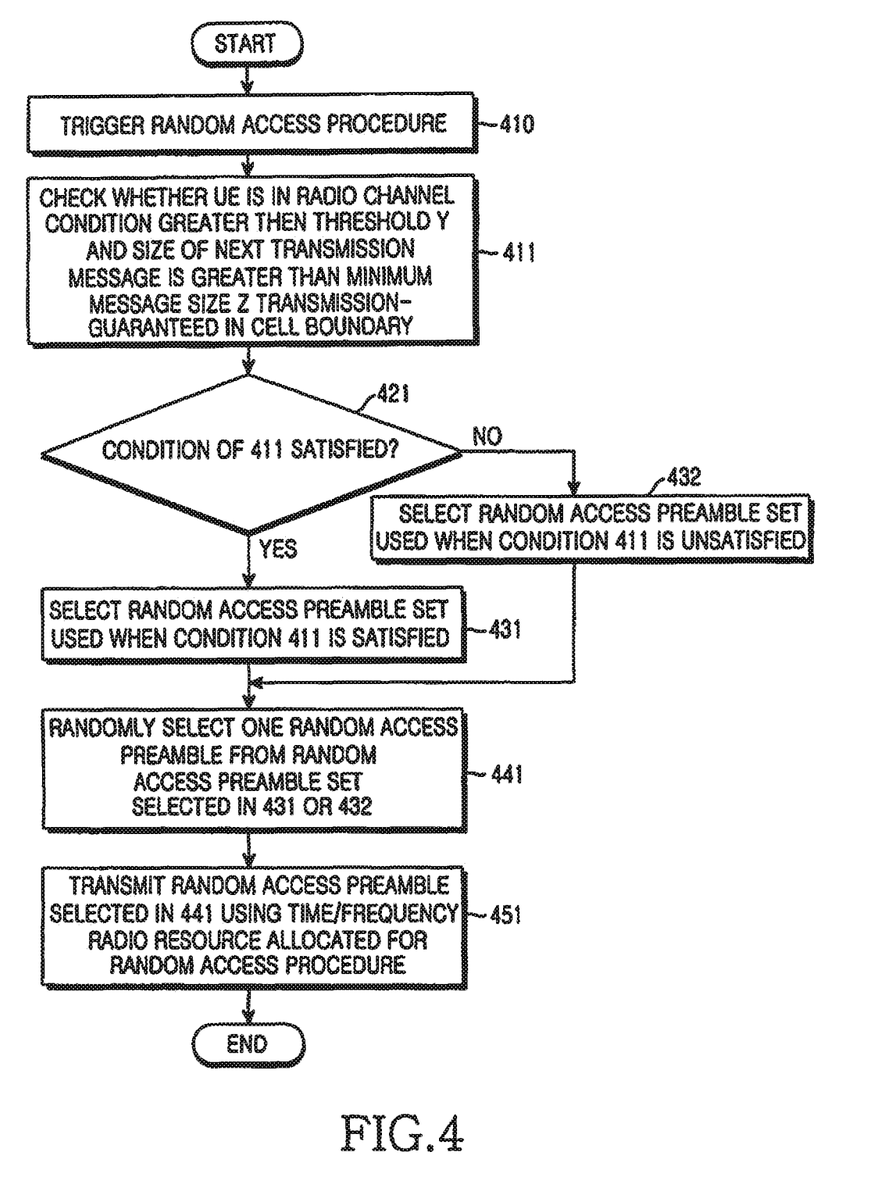
FIG. 4 illustrates a UE's operation based on the random access preamble design according to the present invention.

FIG. 4 illustrates a UE's operation of selecting a random access preamble from a set separated based on the random access preamble design according to the present invention.

Referring to FIG. 4, if a random access procedure is triggered in step 410, the UE checks in step 411 whether it is in a radio channel condition that is greater than a threshold Y and a size of the message that the UE will transmit next is greater than the minimum message size Z transmission-guaranteed in the cell boundary. In step 411, the UE can determine whether it is in a radio channel condition that is greater than a threshold in the method described in FIG. 3.

If the UE determines in step 421 that the condition of step 411 is satisfied, i.e. if the UE is in a radio channel condition that is greater than the threshold and the size of the message that the UE will transmit next is greater than the minimum message size Z transmission-guaranteed in the cell boundary, the UE proceeds to step 431.

In step 431, the UE selects a random access preamble set used when the condition of step 411, guaranteeing the radio channel condition, is satisfied. For example, the UE will select the random access preamble set A of Table 1. However, if the UE determines that the condition of step 411 is not satisfied, the UE proceeds to step 432 where it selects another random access preamble set separated from the random access preamble set guaranteeing the radio channel condition. For example, the UE will select the random access preamble set B of Table 1.

In step 441, the UE randomly selects one random access preamble from the random access preamble set separately selected in step 431 or 432. Thereafter, in step 451, the UE transmits the selected random access preamble to an ENB (or network node) over the uplink using the time/frequency radio resources allocated for the random access procedure.

Figure 5:
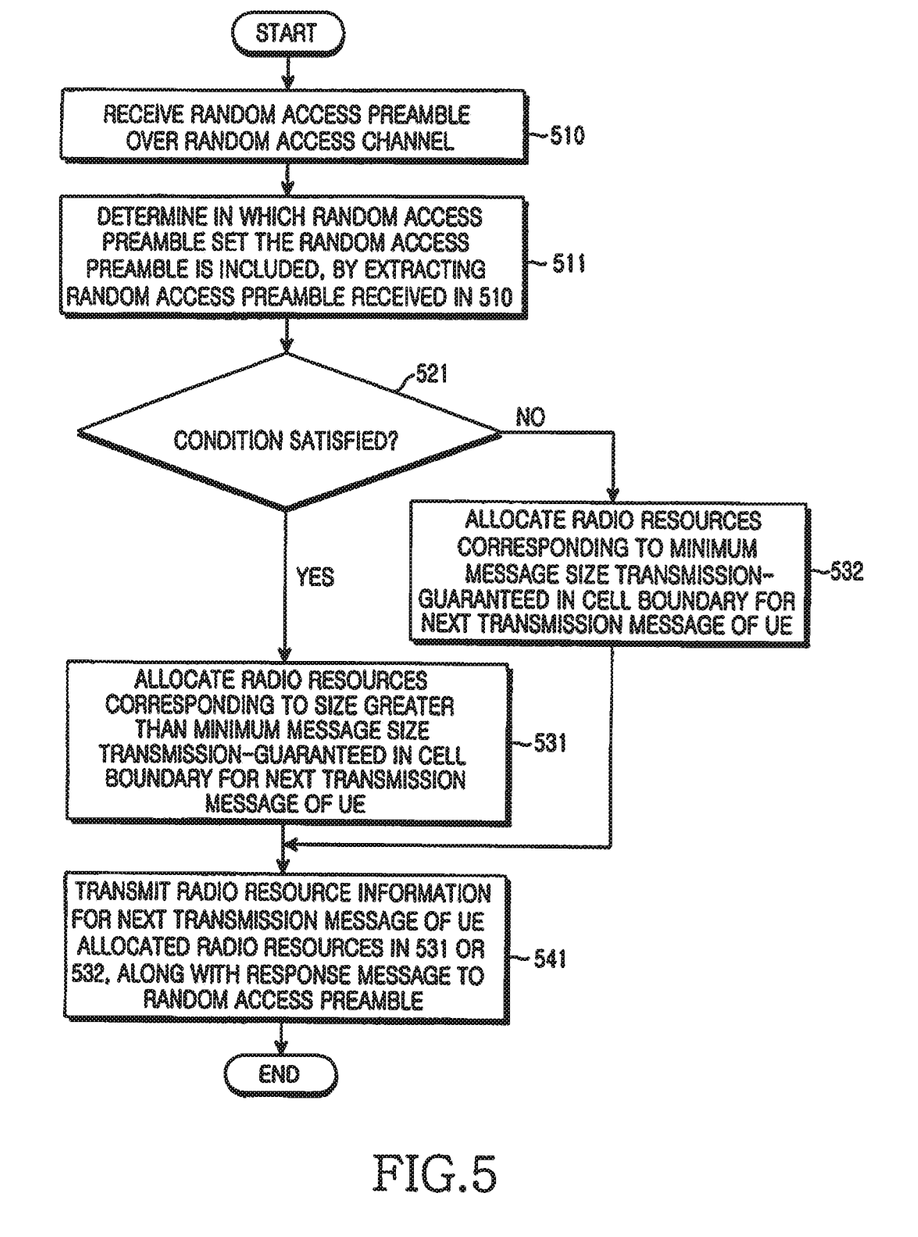
FIG. 5 illustrates an ENB's operation based on the random access preamble design according to the present invention.

FIG. 5 illustrates an ENB's operation of allocating radio resources based on the random access preamble design according to the present invention.

Referring to FIG. 5, in step 510, the ENB receives a random access preamble from a UE over a channel allocated for a random access procedure. In step 511, the ENB determines in which random access preamble set the random access preamble is included, by extracting the received random access preamble.

If it is determined that the random access preamble set determined in step 511 is included in the preamble set used when the UE is in a good radio channel condition and a size of the message that the UE will transmit next is greater than the minimum message size transmission-guaranteed in the cell boundary ('YES' in step 521), the ENB proceeds to step 531.

In step 531, the ENB allocates radio resources so that the UE can transmit a message, a size of which is greater than the minimum message size transmission-guaranteed in the cell boundary, for the message that the UE will transmit next.

However, if the ENB determines that the random access preamble set determined in step 511 corresponds to another preamble set separated from the preamble set corresponding to the condition of step 521 ('NO' in step 521), the ENB proceeds to step 532.

In step 532, the ENB allocates radio resources so that the UE can transmit a message, a size of which is equal to the minimum message size transmission-guaranteed even in the cell boundary, for the message that the UE will transmit next.

In step 541, the ENB transmits, along with a response message to the random access preamble, radio resource information for the message that the UE, allocated the radio resources in step 531 or 532, will transmit next.

Figure 6:
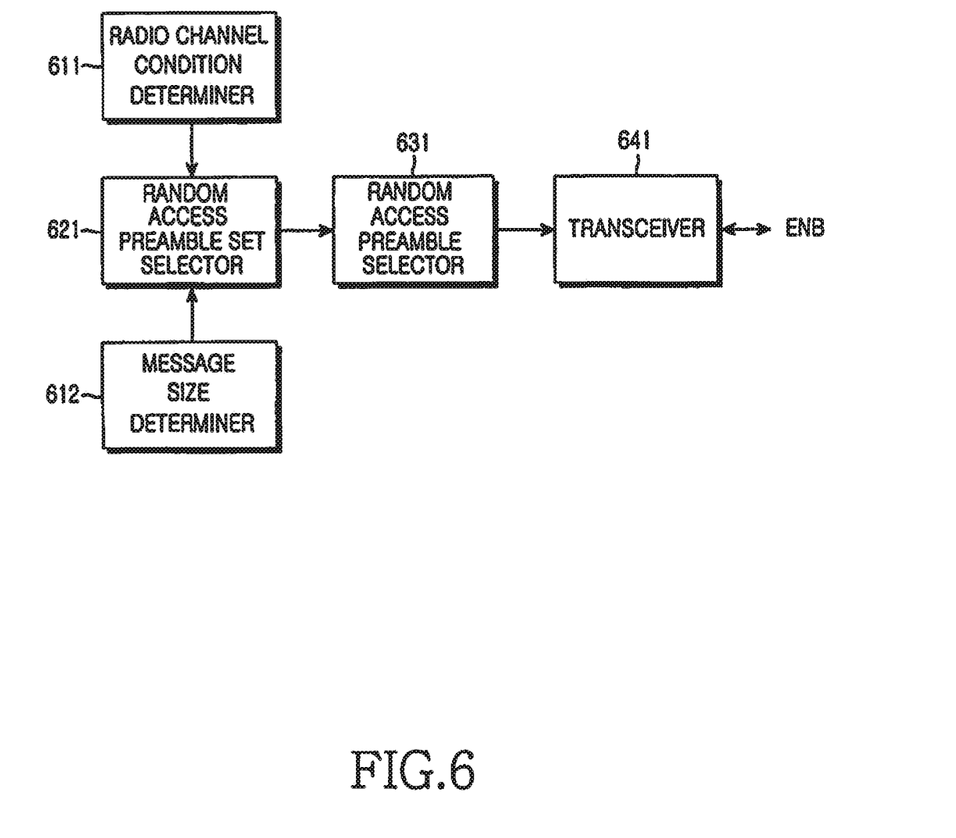
FIG. 6 illustrates a block diagram of a UE's apparatus according to the present invention.

FIG. 6 illustrates a block diagram of a UE's apparatus for selecting a random access preamble from a set separated based on the random access preamble design according to the present invention.

Referring to FIG. 6, the UE includes a radio channel condition determiner 611, a message size determiner 612, a random access preamble set selector 621, a random access preamble selector 631 and a transceiver 641.

The radio channel condition determiner 611 determines whether the radio channel condition of the UE is greater than a threshold Y. As described in FIG. 3, the radio channel condition determiner 611 determines the radio channel condition depending on such information as CQI, a path loss and an interference level at an ENB antenna.

The message size determiner 612 determines a size of the message that the UE will transmit next over the uplink. The message size determiner 612 determines whether the message size is greater or less than the minimum message size transmission-guaranteed even in the cell boundary.

The random access preamble set selector 621 selects a random access preamble set that the UE will use, according to the decisions made by the radio channel condition determiner 611 and the message size determiner 612. The random access preamble set can be separated into one set used when the radio channel condition is greater than the threshold Y and a size of the message that the UE will transmit next is greater than the minimum message size transmittable even in the cell boundary, and another set used when the above condition is not satisfied. That is, the random access preamble set selector 621 selects one of the set A and set B, which are random access preamble sets separated considering the provided radio channel condition information and the message size information necessary for the next uplink upper message transmission.

For example, if the UE is in a radio channel condition that is greater than the threshold Y and a size of the message that the UE will transmit over an upper message is greater than the minimum message size transmission-guaranteed even in the cell boundary, the random access preamble set selector 621 selects the random access preamble set A. However, if the above condition is not satisfied, the random access preamble set selector 621 selects the random access preamble set B separated from the random access preamble set A.

The random access preamble selector 631 randomly selects one random access preamble from the random access preamble set selected by the random access preamble set selector 621.

The transceiver 641 transmits the random access preamble selected by the random access preamble selector 631 to the ENB using the allocated time/frequency radio resource.

Figure 7:
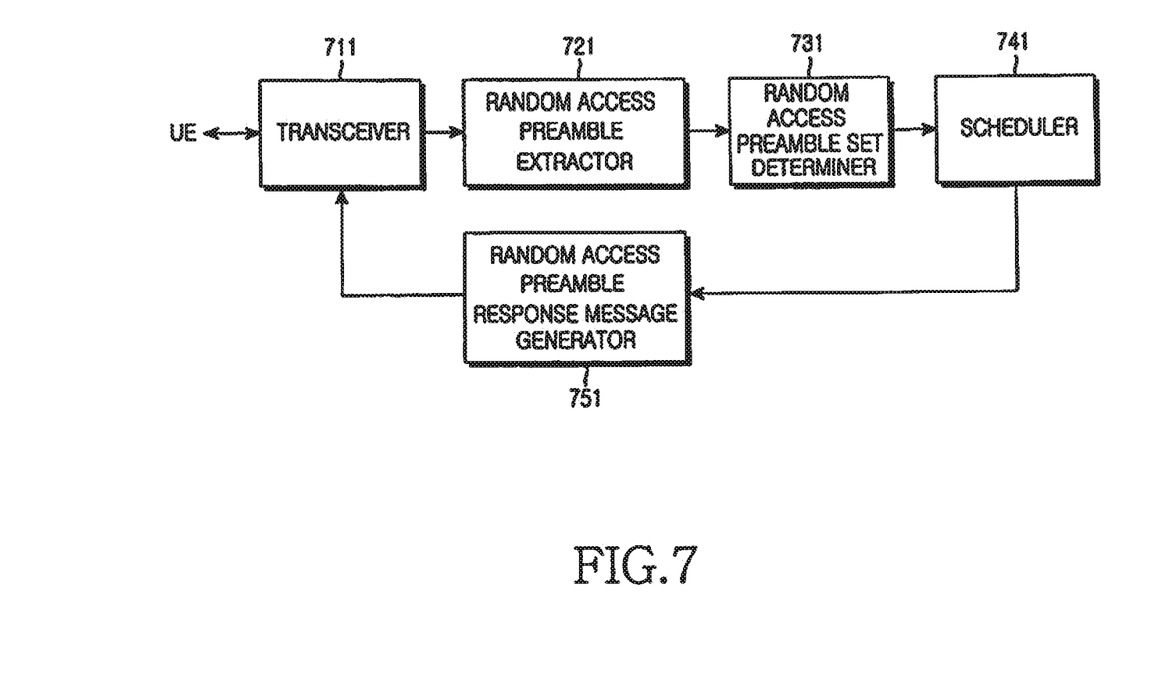
FIG. 7 illustrates a block diagram of an ENB's apparatus according to the present invention.

FIG. 7 illustrates a block diagram of an ENB's apparatus for allocating radio resources based on the random access preamble design according to the present invention.

Referring to FIG. 7, the ENB includes a transceiver 711, a random access preamble extractor 721, a random access preamble set determiner 731, a scheduler 741 and a random access preamble response message generator 751.

The transceiver 711 receives a random access channel from a UE. The random access preamble extractor 721 extracts the random access preamble transmitted by the UE using the received random access channel.

The random access preamble set determiner 731 determines to which random access preamble set the random access preamble parsed by the random access preamble extractor 721 corresponds. The acquired random access preamble set result is delivered to the scheduler 741.

The scheduler 741 determines the radio channel condition of the UE depending on the acquired random access preamble set. Therefore, the scheduler 741 determines radio resource allocation considering the radio channel condition when allocating radio resources for the next transmission message of the UE.

The random access preamble response message generator 751 transmits information on the radio resources allocated by the scheduler 741 to the UE via the transceiver 711, along with the random access preamble response message. If the random access preamble set determined by the random access preamble set determiner 731 is the set used when the radio channel condition of the UE is greater than the threshold Y and the size of the message that the UE will transmit next is greater than the minimum message size transmittable even in the cell boundary, the scheduler 741 allocates radio resources for a message, a size of which is greater than the minimum message size, for the next transmission message of the UE.

However, if it is determined that the random access preamble set checked by the random access preamble set determiner 731 belongs to another random access preamble set that cannot satisfy the above condition, the scheduler 741 allocates radio resources corresponding to the minimum message size for the next transmission message of the UE.

As is apparent from the foregoing description, the present invention provides a method and apparatus for allocating resources to guarantee the message size transmittable by the UE considering the radio channel condition of the UE in the next generation mobile communication system.

According to the present invention, the UE selects a random access preamble from the set separated considering the radio channel condition and the message size. That is, the UE selects and transmits the random access preamble guaranteeing the collision between UEs, thereby performing the procedure for guaranteeing reliability between the UE performing the random access procedure and the upper network node.

Further, according to the present invention, the network node allocates radio resources fully considering the radio channel condition of the UE, thereby contributing to an increase in efficiency of the limited radio resources.

As a result, the present invention provides an efficient random access procedure in the mobile communication system, to allocate efficient radio resources for uplink transmission of the UE.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for performing a random access by a user equipment (UE) in a wireless communication system, the method comprising:
    identifying a path loss and a size of a message that the UE will transmit after a transmission of a preamble;
    selecting a preamble set from at least two preamble sets based on a first threshold and a second threshold, wherein a first preamble set is selected if the path loss is less than the first threshold and the size of the message is greater than the second threshold, wherein a second preamble set is selected if the path loss is greater than or equal to the first threshold, or the size of the message is less than or equal to the second threshold;
    selecting a preamble from the selected preamble set;
    transmitting, to a base station, the selected preamble;
    receiving, from the base station, a random access response message including resource allocation information in response to the transmission of the selected preamble; and
    transmitting, to the base station, a radio resource control message based on the resource allocation information.

2. The method of claim 1,
    wherein the path loss is determined by comparing a transmission power to a reception power for a downlink pilot channel.

3. The method of claim 1,
    wherein the first threshold is associated with a maximum transmission power and a value in system information broadcasted by the base station.

4. The method of claim 1,
    wherein the second threshold is configured by broadcasted system information.

5. The method of claim 1,
    wherein the random access response message comprises at least one of a preamble identifier mapped to the transmitted selected preamble, uplink sync information, and resource information for a next uplink message transmission.

6. A user equipment (UE) for performing a random access in a wireless communication system, the UE comprising:
    a transceiver configured to transmit or receive data; and
    a controller configured to:
        identify a path loss and a size of a message that the UE will transmit after a transmission of a preamble,
        select a preamble set from at least two preamble sets based on a first threshold and a second threshold, wherein a first preamble set is selected if the path loss is less than the first threshold and the size of the message is greater than the second threshold, and wherein a second preamble set is selected if the path loss is greater than or equal to the first threshold, or the size of the message is less than or equal to the second threshold,
        select a preamble from the selected preamble set,
        transmit, to a base station, the selected preamble,
        receive, from the base station, a random access response message including resource allocation information in response to the transmission of the selected preamble, and
        transmit, to the base station, a radio resource control message based on the resource allocation information.

7. The UE of claim 6,
    wherein the path loss is determined by comparing a transmission power to a reception power for a downlink pilot channel.

8. The UE of claim 6,
    wherein the first threshold is associated with a maximum transmission power and a value in system information broadcasted by the base station.

9. The UE of claim 6,
    wherein the second threshold is configured by broadcasted system information.

10. The UE of claim 6,
    wherein the random access response message comprises at least one of a preamble identifier mapped to the transmitted selected preamble, uplink sync information, and resource information for a next uplink message transmission.

11. A method for performing a random access by a user equipment (UE) in a wireless communication system, the method comprising:
    identifying a size of a message that the UE will transmit after a transmission of a preamble;
    selecting a preamble set from at least two preamble sets based on a first threshold and a second threshold, wherein a first preamble set is selected if a radio channel condition is greater than the first threshold and the size of the message is greater than the second threshold, and wherein a second preamble set is selected if the radio channel condition is less than or equal to the first threshold or the size of the message is less than or equal to the second threshold;
    selecting a preamble from the selected preamble set;
    transmitting, to a base station, the selected preamble;
    receiving, from the base station, a random access response message including resource allocation information in response to the transmission of the selected preamble; and
    transmitting, to the base station, a radio resource control message based on the resource allocation information.

* * * * *